United States Patent [19]

Varzescu

[11] Patent Number: 5,343,987
[45] Date of Patent: Sep. 6, 1994

[54] DUAL SECONDARY SHOE DRUM BRAKE WITH MEANS PREVENTING DEPLETION OF HYDRAULIC CYLINDER

[75] Inventor: Victor Varzescu, Koblenz, Fed. Rep. of Germany

[73] Assignee: Lucas Industries public limited company, Birmingham, England

[21] Appl. No.: 820,660
[22] PCT Filed: Oct. 5, 1990
[86] PCT No.: PCT/EP90/01675
§ 371 Date: Jan. 17, 1992
§ 102(e) Date: Jan. 17, 1992
[87] PCT Pub. No.: WO92/06314
PCT Pub. Date: Apr. 16, 1992
[51] Int. Cl.$^5$ .............. F16D 65/09; F16D 65/56; F16D 51/18
[52] U.S. Cl. .............. 188/79.63; 188/196 D
[58] Field of Search ............... 188/79.51, 79.63, 79.64, 188/79.54, 196 D, 196 BA, 795 L, 79.62

[56] References Cited

U.S. PATENT DOCUMENTS

| | | | |
|---|---|---|---|
| 2,619,198 | 11/1952 | Freund | 188/79.63 |
| 2,748,901 | 6/1956 | Brooks | 188/196 BA |
| 3,762,510 | 10/1973 | Newstead | 188/79.63 |
| 4,706,783 | 11/1987 | Rath et al. | 188/196 BA |
| 4,742,897 | 5/1988 | Hiroshi et al. | 188/79.51 |

FOREIGN PATENT DOCUMENTS

| | | |
|---|---|---|
| 2145378 | 3/1972 | Fed. Rep. of Germany ... 188/79.63 |
| 3021794 | 12/1981 | Fed. Rep. of Germany . |
| 1263527 | 3/1988 | Fed. Rep. of Germany . |

*Primary Examiner*—Matthew C. Graham
*Attorney, Agent, or Firm*—Oblon, Spivak, McClelland, Maier & Neustadt

[57] ABSTRACT

A hydraulic wheel brake cylinder (12) and the housing (22) of an intermediate support (20) are mounted diametrically opposite each other on an anchor plate (10) and on said intermediate support (20) two brake shoes (16, 18) bear with their ends remote from the wheel brake cylinder (12). A mechanical actuator (50-58) is additionally arranged in the vicinity of the wheel brake cylinder (12). The wheel brake cylinder (12) and the intermediate support (20) are so arranged that on hydraulic actuation of the brake in the forward direction both brake shoes (16, 18) are secondary shoes. On the housing (22) of the intermediate support (20) a guide (24) at least approximately parallel to the wheel brake cylinder (12) and a stop (26) ar formed. In the guide (24) an adjusting member (28) is axially displaceable to a limited extent. one of the brake shoes (16) is supported at one end of a push member (34) which on hydraulic actuation of the brake is displaceable by a force (C) acting on its second end in the direction towards said brake shoe (16). The push member (34) is connected to the adjusting member (28) in a manner which is free of self-locking with respect to said force (C) but is self-locking in the opposite direction. On hydraulic actuation the brake has a degressive characteristic but on mechanical actuation a progressive one.

5 Claims, 1 Drawing Sheet

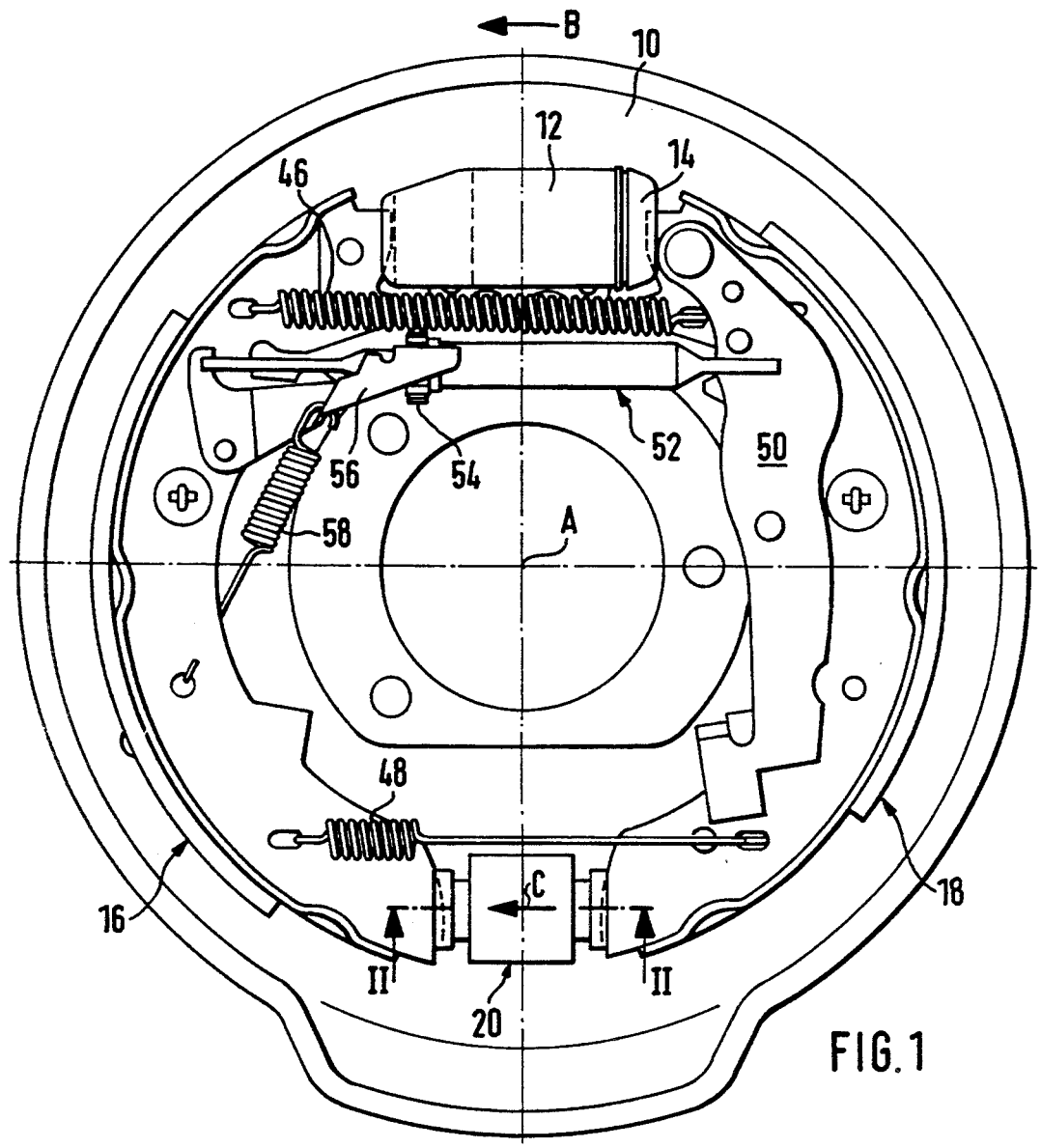
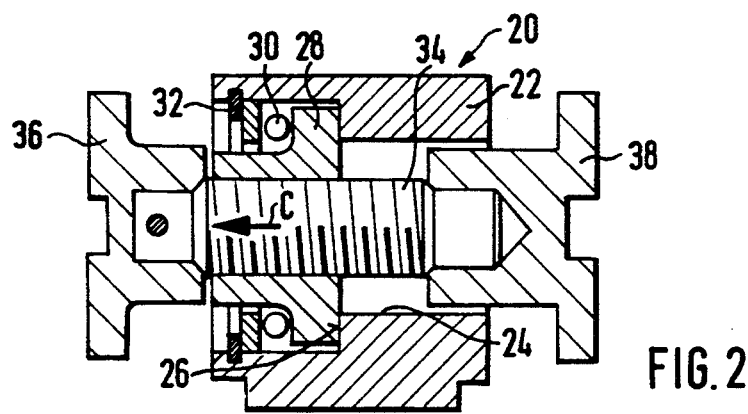
FIG.1
FIG.2

DUAL SECONDARY SHOE DRUM BRAKE WITH MEANS PREVENTING DEPLETION OF HYDRAULIC CYLINDER

FIELD OF THE INVENTION

The invention relates to a hydraulically and mechanically actuable drum brake, in particular for rear wheels of a motor vehicle, comprising
- a hydraulic wheel brake cylinder which is secured to an anchor plate and includes a piston,
- a first brake shoe which bears with one end on the wheel brake cylinder,
- a second brake shoe which bears with one end on the piston,
- an intermediate support on which both brake shoes bear with their ends remote from the wheel brake cylinder, and
- a mechanical actuating means with which the brake shoes can be moved apart in the vicinity of the wheel brake cylinder,
- the wheel brake cylinder and the intermediate support being so arranged that on hydraulic actuation of the brake during forward travel both brake shoes are secondary shoes.

BACKGROUND OF THE INVENTION

In a known drum brake of this type (DE 3021794 A1) the intermediate support is mounted for oscillation or is displaceably guided on the anchor plate in such a manner that the ends of the two brake shoes supported thereon can execute a floating movement substantially parallel to the wheel brake cylinder. When this brake is mechanically actuated whilst the associated vehicle is travelling forwards or for example tends to roll forwards due to a gradient, the brake drum entrains the first brake shoe so that the end thereof normally supported at a closed end face of the wheel brake cylinder moves away from the latter and the other end thereof exerts a peripheral force on the adjacent end of tile second brake shoe via the floating intermediate support. The second brake shoe is pressed by this force and by peripheral forces acting from the brake drum directly thereon against the piston of the wheel brake cylinder so that the latter is displaced into the wheel brake cylinder and displaces brake fluid until it comes to bear on a stop in the wheel brake cylinder.

The displaced brake fluid must be replenished by the master brake cylinder on the next hydraulic brake actuation. This requires a travel of the brake pedal which is greater than the usual pedal travel. In unfavourable cases, the travel of the brake pedal necessary for refilling the wheel brake cylinders can be greater than the maximum possible pedal travel so that adequate hydraulic braking is possible only after repeated actuation of the brake pedal, if at all. The known drum brake thus did not acquire any practical significance although in a desirable manner it has a braking coefficient which in hydraulic braking is comparatively small and has a degressive characteristic but on mechanical actuation is comparatively large and has a progressive characteristic.

The braking coefficient is understood as the ratio of the sum of the peripheral forces acting on the brake shoes during braking to tile clamping force with which the brake shoes are pressed against the brake drum. Characteristic means the dependence of the brake coefficient on the friction coefficients of the pair comprising brake lining and brake drum.

SUMMARY OF THE INVENTION

The invention is based on the problem of providing a hydraulically and mechanically actuable drum brake which on hydraulic actuation has a degressive characteristic but on mechanical actuation a progressive characteristic and which avoids or at least reduces the disadvantageous displacement of brake fluid from the wheel brake cylinder on mechanical actuation.

The problem is solved according to the invention proceeding from a drum brake of the type set forth in the preamble in that
- the intermediate support comprises a housing which is secured to the anchor plate and has a guide at least approximately parallel to the wheel brake cylinder and a stop,
- in the guide an adjusting member is axially displaceable to a limited extent and
- a push member which with one of its two ends supports the first brake shoe and on hydraulic actuation of the brake is displaceable by a force acting on its second end in the direction towards the first brake shoe and is connected to the adjusting member in a manner free of self-locking with respect to said force but self-locking in the opposite direction.

This achieves that hydraulic brake actuating forces, irrespective of the state of wear of the friction linings of the brake shoes, are transmitted substantially unobstructed by the second brake shoe, which is actuated directly by the piston of the wheel brake cylinder, via the intermediate support to the first brake shoe but that mechanical brake actuating forces and peripheral forces which during forward travel act from the brake drum on the first brake shoe are not transmitted to the second brake shoe. If the brake drum rotates or tends to rotate in the operating direction of rotation, the intermediate support according to the invention thus acts in hydraulic brake actuation like a floating intermediate support but in mechanical brake actuation like an intermediate support secured on the whole rigidly.

For otherwise the same conditions, on hydraulic actuation the brake according to the invention has the same degressive characteristic as the known brake according to the preamble described; on mechanical actuation the brake according to the invention has a slightly progressive characteristic which rises less steeply than the characteristic of the known brake on mechanical actuation. The only relatively slightly progressive characteristic of the brake according to the invention on mechanical actuation is desirable because it prevents overbraking on erroneously mechanically actuating the brake in forward travel. In reverse travel the brake according to the invention admittedly has a more highly progressive characteristic similar to the known brake described; this is however not detrimental because normally reverse travel is at only low speed and consequently unintentional overbraking as a rule will not involve any risk of accident. This is all the less so because brakes according to the invention are generally provided only on rear wheels of motor vehicles which can be very strongly braked on rearward travel without any danger of skidding.

The connection according to the invention of the push member with the adjusting member in a manner free from self-locking in one direction and self-locking in the opposite direction has the additional advantage that during the entire life of its friction lining both in mechanical braking and in hydraulic braking the first brake shoe is prevented from executing appreciable movements in the peripheral direction of the brake drum. The occasional knocking noises occurring on actuation of known drum brakes due to such movements can be avoided by the steps described in the brake according to the invention.

Advantageous further developments will be apparent from the subsidiary claims.

BRIEF DESCRIPTION OF THE DRAWINGS

Examples of embodiment of the invention will be explained hereinafter with the aid of schematic drawings showing further details, wherein:

FIG. 1 shows an overall view of a drum brake according to the invention and

FIG. 2 shows the partial section II—II of FIG. 1.

DESCRIPTION OF THE PREFERRED EMBODIMENTS

The brake is associated with a brake drum which is not illustrated and the axis of which is denoted by A, the operational direction of rotation being denoted by the arrow B. The supporting component of the brake is a substantially circular anchor plate 10; to the latter, in a region near the edge, a wheel brake cylinder 12 is rigidly secured, the left end of which in FIG. 1 is closed and from the right end of which a piston 14 projects. A first brake shoe 16 arranged on the left in FIG. 1 and a second brake shoe 18 arranged on the right are guided on the anchor plate 10. The first brake shoe 16 bears with its upper end in FIG. 1 on the closed end of the wheel brake cylinder 12; the second brake shoe 18 bears with its upper end on the piston 14.

Between the lower ends of the two brake shoes 16 and 18 an intermediate support 20 is arranged. The latter comprises a cylindrical housing 22 which lies diametrically opposite the wheel brake cylinder 12 and is likewise rigidly secured to the anchor plate 12. In the housing 22 a guide 24 is formed which extends parallel to the wheel brake cylinder 12 and at a right angle to the perpendicular centre line of the brake in FIG. 1. The guide 24 is a stepped bore; the step thereof forms an annular stop 26 on which an adjusting member 28 normally bears. The adjusting member 28 in the example of embodiment is a nut and is arranged between the stop 26 and an axial bearing 30 which bears via a support ring 32 on the housing 22.

The support ring 32 is a resilient securing ring which is engaged in an inner groove of the housing 22. The adjusting member 28 has a limited axial clearance in the housing 22 and is easily rotatable when it has been moved from the stop 26 in the direction towards the axial bearing 30 or bears on the latter.

A push member 34 extends through the adjusting member 28 in the axial direction of the guide 24 and has a steep outer thread of asymmetrical profile and is in engagement with a complementary inner thread of the adjusting member 28. The thread pair thus formed is free from self-locking in the direction of the arrow C but is self-locking in the opposite direction.

In the example of embodiment drawn the housing 22 is open at both ends and the push member 34 carries at each of its two ends an insert foot 36, 38 on which the respective lower end of the brake shoe 16 or 18 in FIG. 1 bears in such a manner that the push member 34 cannot rotate.

The two brake shoes 16 and 18 are connected together in usual manner by a pair of return springs 46 and 48.

At the upper end, in FIG. 1, of the brake shoe 18 associated with the piston 14 of the wheel brake cylinder 12 a mechanical actuating lever 50 is pivotally mounted in likewise usual manner and is connected by a strut 52 to the brake shoe 16. The strut 52 comprises two strut members which are telescopically extensible and one of which bears on a nut 54 which is screwed to the other strut member. The nut 54 has an outer ratchet toothing; into said toothing one end of an angled pawl 56 engages, which in the region of its apex is mounted on the brake shoe 16 and is biased by a spring 58 in such a manner that with its other end it presses against the adjacent end of the strut 52.

The components 50 to 58 are provided in usual manner which need not be explained for mechanical parking brakes and form an automatic adjusting device which on hydraulic operational brakings effects a lengthening of the struts 52 when, due to lining wear of the brake shoes 16 and 18, the brake clearance has exceeded a predetermined amount.

The brake illustrated operates as follows: On hydraulic actuation in forward travel the second brake shoe 18 exerts a force C via the push member 34 on the first brake shoe 16 which is thereby applied to the brake drum without its upper end in FIG. 1 moving away from its supporting at the wheel brake cylinder 12. Due to the peripheral force acting from the brake drum on the second brake shoe 18, the force C is smaller than the actuating force exerted by the piston 14 on the second brake shoe 18. The force with which the brake shoe 16 bears on the closed end of the wheel brake cylinder 12, on the left in FIG. 1, is less than the force C, this being due to the peripheral force acting from the brake drum on the first brake shoe 16. On hydraulic actuation both brake shoes 16 and 18 are secondary shoes; the characteristic of the brake is degressive.

The adjusting member 28 has a predetermined clearance between the stop 26 and the axial bearing 30; in addition, there is a clearance between the threads of the adjusting member 28 and the push member 34. On hydraulic actuation, the sum of these clearances is exceeded when the brake clearance of the first brake shoe 16 has exceeded a predetermined value due to wear of its friction lining. In this case, the force C causes the push member 34 to be screwed somewhat through the adjusting member 28, the push member 34 being prevented from rotation by the insert foot 36 secured thereto and cooperating with the first brake shoe 16 whilst the adjusting member 28 rotates. After the hydraulic brake actuation the push member thus cannot return to its starting position but assumes a new position in which in accordance with FIGS. 1 and 2 it is shifted to the left, corresponding to the adjustment.

On mechanical actuation of the brake illustrated the first brake shoe 16 acts as primary shoe because it bears via the insert foot 36 on the push member 34 which is prevented from moving to the right by its threaded connection, self-locking to the right, with the adjusting member 28 bearing on the stop 26. The second brake shoe 18 however acts as secondary shoe. Overall, the characteristic of the brake is slightly progressive on mechanical actuation.

I claim:

1. Hydraulically and mechanically actuable drum brake comprising a hydraulic wheel brake cylinder (12) which is fixed to an anchor plate (10) and includes a piston (14), a first brake shoe (16) which bears with one end on the wheel brake cylinder (12), a second brake shoe (18) which bears with one end on the piston an intermediate support (20) on which bear both of those ends (16, 18) of brake shoes which are remote from the wheel brake cylinder (12), and a mechanical actuating means (50-58) with which the brake shoes (16, 18) can be moved apart in the vicinity of the wheel brake cylinder (12), the wheel brake cylinder (12) and the intermediate support being so arranged that on hydraulic actuation of the brake during forward travel both brake shoes (16, 18) are secondary shoes; characterized in that the intermediate support (20) comprises a housing (22) which is fixed to the anchor plate (10) ad has a guide (24) at least approximately parallel to the wheel brake cylinder (12) and a stop (26), an adjusting member (28) axially displaceable to a limited extent in said guide and a push member (34) which with one of its two ends supports the first brake shoe (16) and on hydraulic actuation of the brake is displaceable by a force (c) acting on its second end by said second brake shoe (16) in a direction towards the first brake shoe (16), said push member (34) being connected to the adjusting member (28) in a manner permitting free movement of said push member (34) in the direction of said first shoe (16) while movement in the opposite direction is prevented.

2. Drum brake according to claim 1, characterized in that the push member (34) extends through the housing (22) and with its second end bears on the second brake shoe (18).

3. Drum brake according to claim 1, characterized in that the connection between the adjusting member (28) and push member (34) is a threaded connection and the adjusting member (28) is displaceable between a position in which it bears on the stop (26) and a position in which it is freely rotatable.

4. Drum brake according to claim 1, characterized in that the mechanical actuating means (50–58) is formed by a mechanical actuating lever (50) which is pivotally mounted near the wheel brake cylinder (12) on one of the two brake shoes (18), and a strut (52) which extends near the wheel brake cylinder (12) and at least approximately parallel thereto between the actuating lever (50) and the other of the two brake shoes (16).

5. Drum brake according to claim 4, characterized in that the strut (52) is automatically adjustable in its length.

* * * * *